US008078766B2

(12) United States Patent
Takenaka (10) Patent No.: US 8,078,766 B2
(45) Date of Patent: Dec. 13, 2011

(54) APPARATUS AND METHOD OF DISPLAYING IMAGE (75) Inventor: Takahira Takenaka, Tokyo (JP)

(73) Assignee: Sony Corporation, Tokyo (JP)

(*) Notice: Subject to any disclaimer, the term of this patent is extended or adjusted under 35 U.S.C. 154(b) by 269 days.

(21) Appl. No.: 12/116,494

(22) Filed: May 7, 2008

(65) Prior Publication Data

US 2008/0282002 A1 Nov. 13, 2008

(30) Foreign Application Priority Data

May 9, 2007 (JP) ................. P2007-124841

(51) Int. Cl.
G06F 3/00 (2006.01)
(52) U.S. Cl. ............................... 710/8; 710/10
(58) Field of Classification Search .................. 710/8, 10
See application file for complete search history.

(56) References Cited

U.S. PATENT DOCUMENTS

| 6,804,727 | B1* | 10/2004 | Rademacher | 710/9 |
| 2005/0060447 | A1* | 3/2005 | Tanaka | 710/62 |
| 2005/0262271 | A1* | 11/2005 | Ytterstrom | 710/8 |

FOREIGN PATENT DOCUMENTS

| JP | 2 304662 | 12/1990 |
| JP | 2001 202325 | 7/2001 |
| JP | 2003-186819 | 7/2003 |
| JP | 2005-78304 | 3/2005 |
| JP | 2005-128869 | 5/2005 |
| JP | 2005 130168 | 5/2005 |
| WO | WO03/010673 | 2/2003 |

* cited by examiner

Primary Examiner — Henry Tsai
Assistant Examiner — Kris Rhu
(74) Attorney, Agent, or Firm — Frommer Lawrence & Haug LLP; William S. Frommer; Thomas F. Presson (57) ABSTRACT An apparatus of displaying an image connects an external device by using universal serial bus (USB) connection. The apparatus contains a display unit and a control unit that reads device information out of the connected external device and performs display control on the display unit based on the read device information. Under control of the control unit, the display unit displays a message that is used for changing a class of the external device to a class previously specified in the apparatus of displaying the image when the class of the external device is changeable and it is determined based on the device information that the set class of the external device is different from the class previously specified in the apparatus of displaying the image.

6 Claims, 5 Drawing Sheets

FIG. 4 DEVICE DESCRIPTOR

| FIELD | SIZE (BYTE) | DESCRIPTION |
|---|---|---|
| bLength | 1 | SIZE OF DEVICE DESCRIPTOR IN BYTES |
| bDescriptorType | 1 | DESCRIPTOR TYPE |
| bcdUSB | 2 | USB SPECIFICATION RELEASE NUMBER |
| bDeviceClass | 1 | CLASS CODE |
| bDeviceSubClass | 1 | SUBCLASS CODE |
| bDeviceProtocol | 1 | PROTOCOL CODE |
| bMaxPacketSize | 1 | MAXIMUM PACKET SIZE FOR 0 ENDPOINT |
| idVendor | 2 | VENDER ID |
| idProducer | 2 | PRODUCT ID |
| bcdDevice | 2 | DEVICE RELEASE NUMBER |
| iManufacture | 1 | INDEX OF MANUFACTURER |
| iProduct | 1 | INDEX OF PRODUCT |
| iSerialNumber | 1 | INDEX OF SERIAL NUMBER |
| bNumConfiguration | 1 | NUMBER OF POSSIBLE CONFIGURATIONS |

FIG. 5 INTERFACE DESCRIPTOR

| FIELD | SIZE (BYTE) | DESCRIPTION |
|---|---|---|
| bLength | 1 | SIZE OF INTERFACE DESCRIPTOR IN BYTES |
| bDescriptorType | 1 | INTERFACE DESCRIPTOR TYPE |
| bInterfaceNumber | 1 | NUMBER OF INTERFACE |
| bAlternateSetting | 1 | ARGUMENT USED TO SELECT ALTERNATIVE SETTING IN SET INTERFACE |
| bNumEndpoints | 1 | NUMBER OF ENDPOINTS |
| bInterfaceClass | 1 | CLASS CODE |
| bInterfaceSubClass | 1 | SUBCLASS CODE |
| bInterfaceProtocol | 1 | PROTOCOL CODE |
| iInterface | 1 | INDEX OF STRING DESCRIPTOR |

FIG. 6

| CLASS SPECIFICATION | DEVICE CLASS CODE | INTERFACE CLASS CODE |
|---|---|---|
| AUDIO INTERFACE | 00h | 01h |
| COMMUNICATION DEVICE | 02h | — |
| HUMAN INTERFACE DEVICE (HID) | 00h | 03h |
| STILL IMAGE CAPTURE DEVICE (SICD) | 00h | 06h |
| PTINTER | 00h | 07h |
| MASS STORAGE | 00h | 08h |
| ⋮ | | |

APPARATUS AND METHOD OF DISPLAYING IMAGE

CROSS-REFERENCES TO RELATED APPLICATIONS

The present invention contains subject matter related to Japanese Patent Application JP 2007-124841 filed in the Japanese Patent Office on May 9, 2007, the entire contents of which being incorporated herein by reference.

BACKGROUND OF THE INVENTION

1. Field of the Invention

The present invention relates to an apparatus and a method of displaying an image, which are applicable to an apparatus and the like that may connect an external device by using universal serial bus (USB) connection.

2. Description of Related Art

USB connection between a personal computer and an external device has spread recent years. As the external device which may be connected by using the USB connection, various kinds of device such as image device, audio device, memory device, input/output device, and communication device have been presented.

In USB specification, plural classes as device class or interface class are stipulated. By specifying the class of the external device, by its device information, which may be connected to the apparatus of displaying the image by using the USB connection, the apparatus of displaying the image can recognize that the connected external device is any of the image device, the audio device and the like.

As the USB connection has spread, the apparatus of displaying an image such as a television receiver has connected a digital camera, memory device and the like by using the USB connection, in addition to the USB connection between the personal computer and the external device. This enables the television receiver to read any image data stored in the digital camera or the like out thereof and to display it on the screen thereof.

Japanese Patent Application Publication No. 2005-130168 has disclosed a method of recognizing device and a host apparatus in which if such the USB connection is performed, the host apparatus acquires any device information of the portable device according to a series of sequences between the host apparatus and the portable device, thereby detecting which device is connected based on the device information.

SUMMARY OF THE INVENTION

If, however, the above-mentioned image apparatus of displaying the image is provided with a USB interface to which an external device is connected, the apparatus of displaying the image has displayed on its screen an icon indicating that the external device, which may connect the apparatus of displaying the image by using the USB connection, has been connected (hereinafter, referred to as "device connection icon") if it is determined that the connected external device may connect the apparatus of displaying the image by using the USB connection based on the device information acquired from the connected external device.

Further, relative to an external device connecting the apparatus of displaying the image by using the USB connection, any external device which can change its class has been provided. If, however, the class of the external device is set to a class to which the apparatus of displaying the image does not correspond, the apparatus of displaying the image does not recognize that the external device can be connected by using the USB connection even if the class of the external device may be changed, which prevents the device connection icon or the like from being displayed on the screen thereof. This causes a user to understand erroneously that this connected external device is an apparatus to which the apparatus of displaying the image does not correspond. It may be thus difficult to read out any image data stored in the connected external device and to display the stored image on the screen of the apparatus of displaying the image.

It is desirable to provide an apparatus and a method of displaying an image to which the user easily can connect the external device securely by using the USB connection.

According to an embodiment of the present invention, there is provided an apparatus of displaying an image that connects an external device by using USB connection. The apparatus of displaying an image contains a display unit and a control unit that reads device information out of the connected external device and performs display control on the display unit based on the read device information. Under control of the control unit, the display unit displays a message that is used for changing a class of the external device to a class previously specified in the apparatus of displaying the image when the class of the external device is changeable and it is determined based on the device information that the set class of the external device is different from the class previously specified in the apparatus of displaying the image.

According to another embodiment of the present invention, there is provided a method of displaying an image in an apparatus of displaying an image that connects an external device by using USB connection. The method contains the steps of reading device information out of the external device, and displaying a message that is used for changing a class of the external device to a class previously specified in the apparatus of displaying the image when the class of the external device is changeable and it is determined based on the device information that the set class of the external device is different from the class previously specified in the apparatus of displaying the image.

By the apparatus and the method of displaying the image according to the embodiments of the present invention, it is possible for the apparatus of displaying the image to display a message that helps a user to change the class of the external device to the class previously specified in the apparatus of displaying the image when a class of the connected external device is different from the class previously specified in the apparatus of displaying the image on a case where the user connects the external device to the apparatus of displaying the image by using the USB connection.

According to the embodiments of the invention, the message is displayed if the class of the connected external device is different from the class to which the apparatus of displaying the image corresponds, so that by changing the class of the external device, it is possible to prevent the user from erroneously determining that although the external device can connect the apparatus of displaying the image by using the USB connection, no external device can connect the apparatus of displaying the image by using the USB connection.

The concluding portion of this specification particularly points out and directly claims the subject matter of the present invention. However, those skilled in the art will best understand both the organization and method of operation of the invention, together with further advantages and objects thereof, by reading the remaining portions of the specification

DESCRIPTION OF THE PREFERRED EMBODIMENTS

The following will describe embodiments of an apparatus and a method of displaying an image according to the invention with reference to the accompanied drawings.

Figure 1:
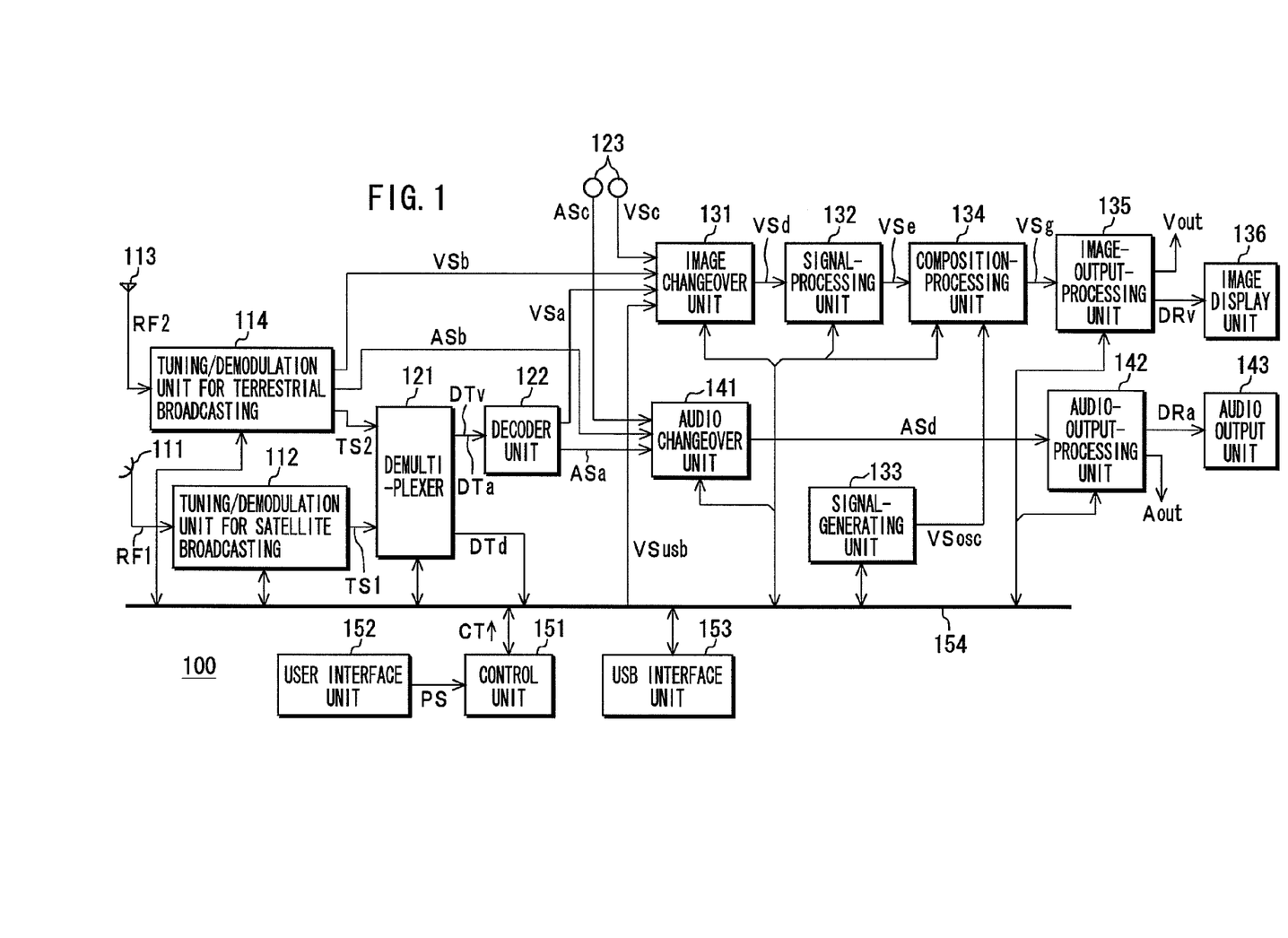
FIG. 1 is a block diagram for showing a configuration of a television receiver to which an embodiment of an apparatus of displaying an image according to the invention is applicable.

FIG. 1 shows a configuration of an apparatus of displaying the image, for example, a television receiver 100. The television receiver 100 is provided with a function of connecting an external device that may be connected thereto by using universal serial bus (USB) connection. It is to be noted that the apparatus of displaying the image may contain a monitor device that has no function of tuning or audio output.

As shown in FIG. 1, the television receiver 100 contains an antenna 111 for satellite broadcasting, which receives a signal RF1 from any digital broadcasting satellites for broadcasting satellite (BS) and communications satellite (CS) and supplies the received signal RF1 to a tuning/demodulation unit 112 for satellite broadcasting. The tuning/demodulation unit 112 for satellite broadcasting selects a desired channel (tunes in frequency on a station) to acquire an intermediate frequency signal and demodulates it digitally to acquire a transport stream TS1. The tuning/demodulation unit 112 for satellite broadcasting then supplies the transport stream TS1 to a demultiplexer 121. In this digital demodulation, the tuning/demodulation unit 112 for satellite broadcasting performs any demodulation processing such as quadrature phase shift keying (QPSK) demodulation, which corresponds to a modulation scheme used in the satellite broadcasting. It is to be noted that a control unit 151, which will be described later, controls operations of the tuning/demodulation unit 112 for satellite broadcasting using a control signal CT transmitted from the control unit 151.

The television receiver 100 also contains an antenna 113 for terrestrial broadcasting, which receives a signal RF2 from a terrestrial station and supplies the received signal RF2 to a tuning/demodulation unit 114 for terrestrial broadcasting. The tuning/demodulation unit 114 for terrestrial broadcasting selects a desired channel to acquire an intermediate frequency signal and demodulates it. When the antenna 113 for terrestrial broadcasting receives a terrestrial analog signal, the tuning/demodulation unit 114 for terrestrial broadcasting performs any analog demodulation processing on the intermediate frequency signal to acquire an image signal, which converts the acquired image signal to a digital image signal VSb, and an audio signal ASb. The tuning/demodulation unit 114 for terrestrial broadcasting then supplies the digital image signal VSb to an image changeover unit 131 and supplies the audio signal ASb to an audio changeover unit 141. Alternatively, when the antenna 113 for terrestrial broadcasting receives a terrestrial digital signal, the tuning/demodulation unit 114 for terrestrial broadcasting performs any digital demodulation processing on the intermediate frequency signal to acquire a transport stream TS2. The tuning/demodulation unit 114 for terrestrial broadcasting then supplies the transport stream TS2 to the demultiplexer 121. In this digital demodulation, the tuning/demodulation unit 114 for terrestrial broadcasting performs any demodulation processing such as quadrature frequency division multiplex (QFDM) demodulation, which corresponds to a modulation scheme used in the terrestrial broadcasting. It is to be noted that the control unit 151, which will be described later, controls operations of the tuning/demodulation unit 114 for terrestrial broadcasting using the control signal CT transmitted from the control unit 151.

The demultiplexer 121 selects the transport stream TS1 when the antenna 111 for satellite broadcasting receives the satellite digital signal or selects the transport stream TS2 when the antenna 113 for terrestrial broadcasting receives the terrestrial digital signal. The demultiplexer 121 further separates image data DTv, audio data DTa, broadcast data DTd and the like from the selected transport stream which includes these items of data in time division multiplexing. The demultiplexer 121 then supplies the image data DTv and the audio data DTa to a decoder unit 122 and supplies the broadcast data DTd to the control unit 151.

The decoder unit 122 receives and decodes the image data DTv to acquire an image signal VSa. The decoder unit 122 then supplies the image signal VSa to the image changeover unit 131. The decoder unit 122 also receives and decodes the audio data DTa to acquire an audio signal ASa. The decoder unit 122 then supplies the audio signal ASa to the audio changeover unit 141.

The image changeover unit 131 is connected to an external input terminal 123, through which an external device transmits any image signal VSc such as a composite signal, a component signal, high definition multimedia interface (HDMI) signal, digital visual interface (DVI) signal, to the image changeover unit 131. The image changeover unit 131 changes over an image signal to be supplied to a signal-processing unit 132, which is connected to the image changeover unit 131, to any one among the image signal VSa received from the decoder unit 122, the image signal VSb received from the tuning/demodulation unit 114 for terrestrial broadcasting, the image signal VSc received through the external input terminal 123, and image data VSusb received and read from a USB device, which will be described later. The image changeover unit 131 also performs format-conversion processing on the received image signal having a different format to supply the converted signal to the signal-processing unit 132 as an image signal VSd such as a luminance signal and color-difference signals.

The signal-processing unit 132 performs various kinds of signal processing such as edge enhancement processing, noise reduction processing, and color adjustments on the image signal VSd received from the image changeover unit 131 to acquire an image signal VSe after the signal processing. The signal-processing unit 132 then supplies the image signal VSe to a composition-processing unit 134 as three-primary-colors signal.

The television receiver 100 further contains a signal-generating unit 133 which generates an image signal VSosc for on-screen display based on the control signal CT received from the control unit 151 and supplies the image signal VSosc for on-screen display to the composition-processing unit 134. For example, the signal-generating unit 133 generates the image signal VSosc for on-screen display such as electronic program guide (EPG) display, channel display, menu screen display, and a setting screen display for carrying out various kinds of setting, based on the control signal CT received from the control unit 151 and supplies the image signal VSosc for on-screen display to the composition-processing unit 134.

The composition-processing unit 134 composes the image signal VSosc for on-screen display received from the signal-generating unit 133 to the image signal VSe received from the signal-processing unit 132 to acquire an image output signal VSg. The composition-processing unit 134 then supplies the image output signal VSg to an image-output-processing unit 135. The composition-processing unit 134 also performs so-called D alpha blending when the composition-processing unit 134 composes the image signal VSosc for on-screen display to the image signal VSe, thereby enabling composite ratio between the image signal VSosc for on-screen display and the image signal VSe to very in the image output signal VSg.

The image-output-processing unit 135 is connected to an image display unit 136 which is constituted of any display device such as liquid crystal display (LCD), plasma display panel (PDP), electro luminescence (EL), and cathode ray tube. The image-output-processing unit 135 generates a display drive signal DRv for driving the display device based on the image output signal VSg and supplies the display drive signal DRv to the image display unit 136. This enables the image display unit 136 to display an image. The image-output-processing unit 135 outputs the image output signal VSg as an output signal Vout having any format corresponding to an external device, not shown, when the image-output-processing unit 135 supplies an image signal to the external device.

The audio changeover unit 141 is connected to the external input terminal 123, through which an external device transmits any audio signal ASc to the audio changeover unit 141. The audio changeover unit 141 changes over an audio signal ASd to be supplied to an audio-output-processing unit 142, which is connected to the audio changeover unit 141, to any one among the audio signal ASa received from the decoder unit 122, the audio signal ASb received from the tuning/demodulation unit 114 for terrestrial broadcasting, the audio signal ASc received through the external input terminal 123.

The audio-output-processing unit 142 is connected to an audio output unit 143 which is constituted of a speaker. The audio-output-processing unit 142 performs any audio processing such as signal level adjustment, tone control, and noise reduction on the audio signal ASd received from the audio changeover unit 141 to generate an audio output signal DRa after the audio processing. The audio-output-processing unit 142 then supplies the audio output signal DRa to the audio output unit 143 which outputs an audio. The audio-output-processing unit 142 outputs an audio output signal after the audio processing as an output signal Aout having any format corresponding to an external device, not shown, when the audio-output-processing unit 142 supplies an audio signal to the external device.

The control unit 151 is connected to a user interface unit 152. The user interface unit 152 is constituted of, for example, operation keys and a receiving portion for a remote control signal. The user interface unit 152 supplies a manipulation signal PS corresponding to any manipulations by a user to the control unit 151.

The control unit 151 also connects the above-mentioned various units through a bus 154. The control unit 151 generates the control signal CT based on the manipulation signal PS received from the user interface unit 152 and supplies the control signal CT to the above-mentioned various units through a bus 154, which enables the television receiver 100 to operate corresponding to the user's manipulations. For example, when the manipulation signal PS received from the user interface unit 152 indicates that the user manipulates any signal changeover such as channel changeover, broadcast changeover, or input changeover, the control unit 151 controls the tuning/demodulation unit 112 for satellite broadcasting and the tuning/demodulation unit 114 for terrestrial broadcasting to select a desired channel thereof or controls the demultiplexer 121, the image changeover unit 131, and the audio changeover unit 141 to perform their changeover operations, in order to enable to be presented image and/or audio of the desired channel or the desired broadcast system, or image and/or audio received from an external device. The control unit 151 further generates a control signal for displaying EPG or the like based on the broadcast data DTd received from the demultiplexer 121 and supplies such the control signal to the signal-generating unit 133.

A USB interface unit 153 is also connected to the bus 154. The USB interface unit 153 is constituted of a USB transceiver for executing any serial communication with connected external device, serial interface engine (SIE) for executing communication control processing corresponding to USB protocol, and the like.

The control unit 151 communicates the USB interface unit 153 and when detecting that an external device connects the USB interface unit 153, the control unit 151 executes a configuration setting to read out address setting of the connected external device and various kinds of pieces of information stored in the connected external device. When detecting that an external device is USB device that can correspond to the apparatus of displaying the image (the television receiver) based on the read information, the control unit 151 communicates this external device to read the image data VSusb out of the external device and supply it to the image changeover unit 131, thereby enabling image stored in the external device to be displayed on the image display unit 136.

The following will describe operations of the television receiver 100 when the television receiver 100 connects the external device with reference to FIGS. 2 through 6.

Figure 2:
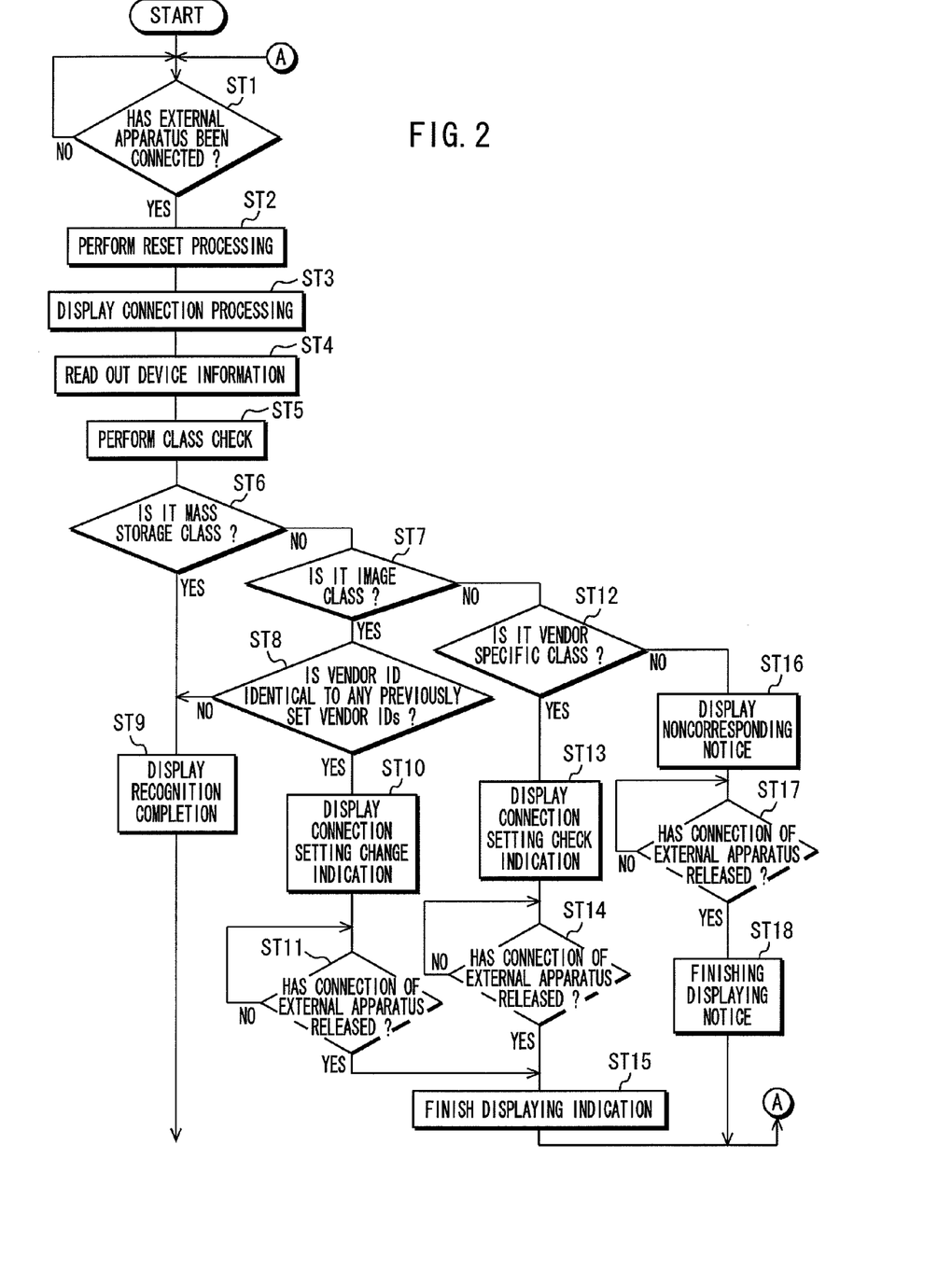
FIG. 2 is a flowchart for showing operations when the television receiver connects an external device.

At step ST1, the control unit 151 determines whether or not the television receiver 100 connects an external device. When the control unit 151 determines that the television receiver 100 connects the external device, the operation goes to step ST2. When the control unit 151 determines that the television receiver 100 connects no external device, the operation goes back to the step ST1. It is to be noted that the control unit 151 may determine whether or not the television receiver 100 connects an external device based on facts whether or not a D+terminal or a D-terminal of USB connector provided in the USB interface unit 153 has a predetermined voltage level.

At the step ST2, the control unit 151 performs any reset processing on the external device. The control unit 151 supplies a reset signal to the external device to reset the external device so as to become its original state. It is to be noted that the external device may communicate the control unit 151 when the external device becomes its original state.

At step ST3, the television receiver 100 displays any connection processing of the external device on its image display unit 136. This enables the user to recognize that the television receiver 100 is determining whether or not the connected external device is USB device that can correspond to the apparatus of displaying the image (the television receiver).

Figure 3A:
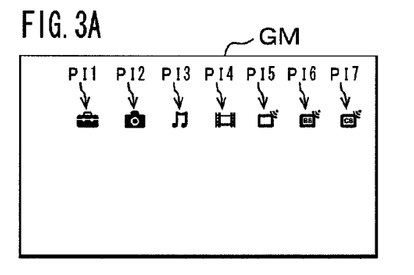
FIGS. 3A through 3F are diagrams each for showing a display screen of the television receiver.
Figure 3B:
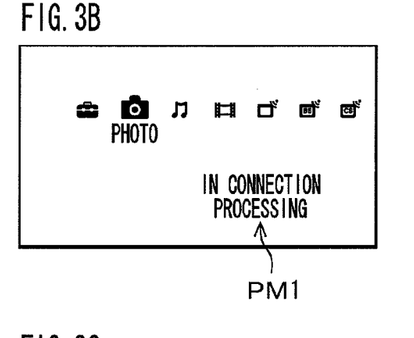

FIGS. 3A through 3F show display screens, which are respectively displayed on the image display unit 136. FIG. 3A shows a menu screen GM. On the menu screen GM, a setting icon PI1 for executing various kinds of setting on image, audio and the like, a photo icon PI2 for reproducing still image and the like stored in the USB device, a music icon PI3 for reproducing music and the like stored in the USB device, a video icon PI4 for reproducing video and the like stored in the USB device, a terrestrial broadcasting icon PI5 for viewing a terrestrial analog broadcasting program or a terrestrial digital broadcasting program, a BS icon PI6 for viewing a digital satellite broadcasting program for BS, a CS icon PI7 for viewing a digital satellite broadcasting program for CS, and the like are displayed. If the user selects any one among these displayed icons, it is easy to recognize the selected icon by changing a display size, display color, display luminance or the like of the selected icon. For example, if the user selects the photo icon PI2, as shown in FIG. 3B, it can be easy to recognize the selected photo icon PI2 by changing a display size of the photo icon PI2 so as to become larger than remaining icons.

The television receiver 100 displays, for example, a message PM1 as shown in FIG. 3B as the connection processing display on its image display unit 136. The message PM1 enables the user to recognize that the television receiver 100 is determining whether or not a connected external device is USB device that can correspond to the apparatus of displaying the image (the television receiver 100). The operation then goes to step ST4.

At the step ST4, the television receiver 100 reads any device information out of the connected external device. The television receiver 100 communicates the connected external device to set an address in the connected external device. The television receiver 100 sends a request code to the set address in the connected external device. The external device then receives the request code and sends the device information thereof requested by the request code to the control unit 151. For example, the television receiver 100 sends "GET DESCRIPTOR" as the request code and reads "DEVICE DESCRIPTOR", "CONFIGURATION DESCRIPTOR", "INTERFACE DESCRIPTOR" and the like out of the connected external device. The operation then goes to step ST5.

Figure 4:
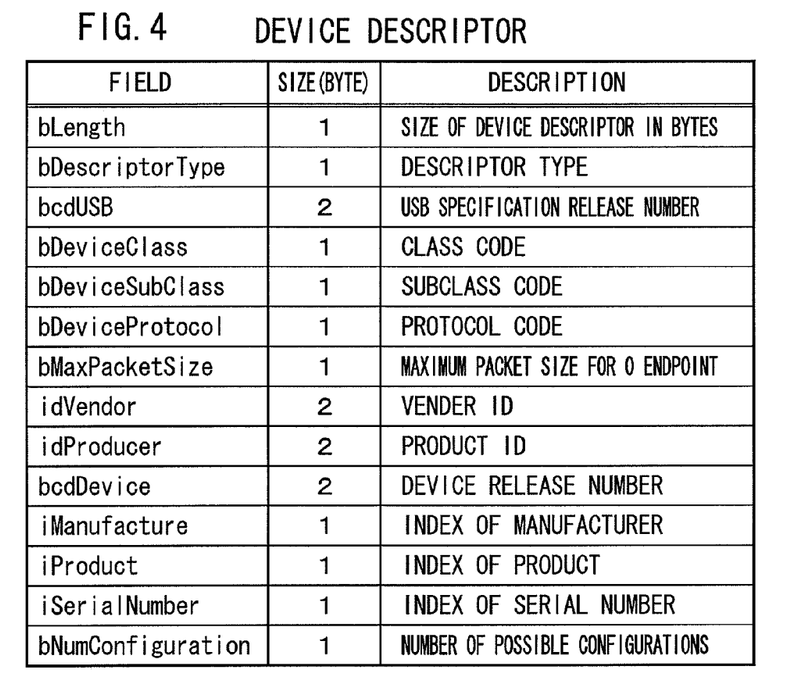
FIG. 4 is a table for showing contents of device descriptor.
Figure 5:
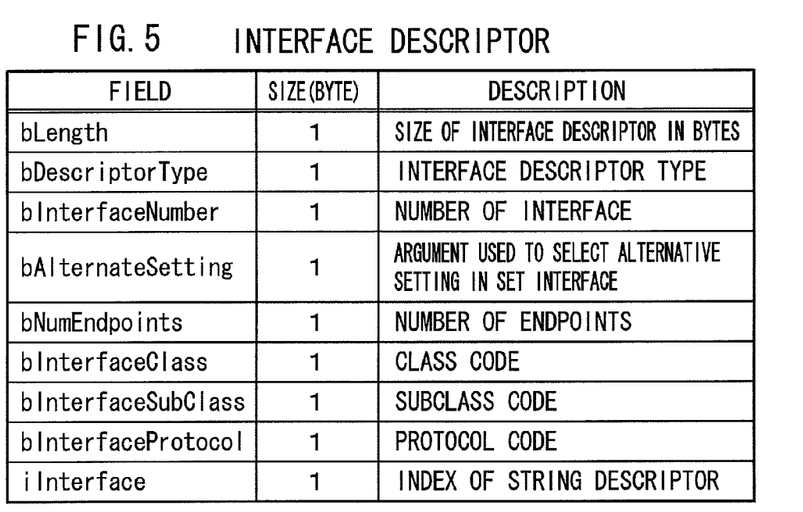
FIG. 5 is a table for showing contents of interface descriptor.

FIG. 4 shows the device information of "DEVICE DESCRIPTOR". The "DEVICE DESCRIPTOR" is constituted of various kinds of pieces of information relative to a version of the corresponding USB specification, a device class, a device subclass, a protocol, a vender identification (ID), a product ID, a device release number, an index of manufacturer, an index of product, an index of serial number, and the like. FIG. 5 shows the device information of "INTERFACE DESCRIPTOR". The "INTERFACE DESCRIPTOR" is constituted of various kinds of pieces of information relative to a number of an interface, an interface class, an interface subclass, an interface protocol, and the like, which are used for selecting the interface.

At the step ST5, the television receiver 100 checks a class of the connected external device. The control unit 151 checks the class of the connected external device based on the "DEVICE DESCRIPTOR" and the "INTERFACE DESCRIPTOR". The operation then goes to step ST6.

Figure 6:
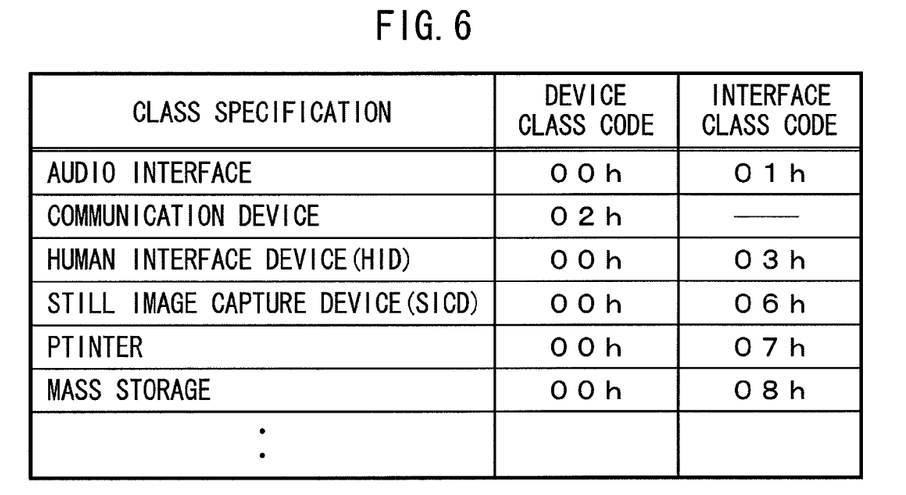
FIG. 6 is a table for showing a relationship between a class specification and each class code.

FIG. 6 shows a class specification and class codes. The class specification contains an audio interface class, a communication device class, a human interface device (HID) class, a still image capture device (SICD) class, a printer class, and a mass storage class.

On the audio interface class, the device class code is set to "00h" and the interface class code is set to "01h", wherein h indicates hexadecimal number. On the communication device class, the device class code is set to "02h". On the HID class, the device class code is set to "00h" and the interface class code is set to "03h". On the SICD class, the device class code is set to "00h" and the interface class code is set to "06h". On the printer class, the device class code is set to "00h" and the interface class code is set to "07h". On the mass storage class, the device class code is set to "00h" and the interface class code is set to "08h". If the class code is set to "FFh", this class code indicates vendor specific class.

At the step ST6, the control unit 151 determines whether or not the external device has mass storage class. If the class checked at the step ST5 is included in the mass storage class, namely, its device class code is "00h" and its interface class code is "08h", the operation goes to step ST9. If the class checked at the step ST5 is not included in the mass storage class, the operation goes back to step ST7.

Figure 3C:
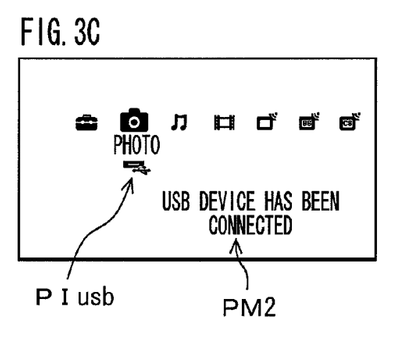

At the step ST9, the television receiver 100 displays recognition completion to enable the user to recognize that the connected external device is USB device that can correspond to the apparatus of displaying the image (the television receiver 100). For example, the control unit 151 controls the signal-generating unit 133 to display device connection icon PIusb and/or a message PM2, which indicates that the USB device that can correspond to the apparatus of displaying the image (the television receiver 100) has been connected, as shown in FIG. 3C.

At the step ST7, the control unit 151 determines whether or not the external device has image class. If the class checked at the step ST5 is included in the image class, namely, its device class code is "00h" and its interface class code is "06h", the operation goes to step ST8. If the class checked at the step ST5 is not included in the image class, the operation goes back to step ST12.

At the step ST8, the control unit 151 determines whether or not the vendor ID of the connected external device is identical to any vendor IDs previously set in the television receiver 100. As the previously set vendor IDs, IDs of the venders who present USB device that can change over its USB device class to the mass storage class are used.

If the vendor ID indicated in the "DEVICE DESCRIPTION" of the connected external device is not identical to any vendor IDs previously set in the television receiver 100, the operation goes to the step ST9 where the television receiver 100 displays recognition completion to enable the user to recognize that the connected external device is USB device that can correspond to the apparatus of displaying the image (the television receiver 100). It is to be noted that at the step ST9, it is not only possible to display the device connection icon PIusb and/or the message PM2, but also to display any class recognizably in which the television receiver 100 connects the external device.

If the vendor ID indicated in the "DEVICE DESCRIPTION" of the connected external device is identical to any vendor IDs previously set in the television receiver 100, the operation goes to step ST10.

Figure 3D:
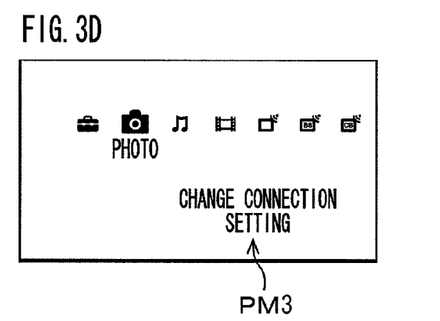

At the step ST10, the television receiver 100 displays any connection-setting change indication and displays a message to advise the user to change the connection setting of the connected external device. For example, the control unit 151 controls the signal-generating unit 133 to display a message PM3 as shown in FIG. 3D. The operation then goes to step ST11.

At the step ST11, the control unit 151 determines whether or not the connection of the external device has been released. If the external device keeps on connecting the television receiver 100, the operation goes back to the step ST11 where the message PM3 keeps on displaying. If the connection of the external device has been released, for example, a USB cable has been released from a USB connector in the USB interface unit 153 or a USB connector in the external device, the operation goes to step ST15 where the control unit 151 finishes displaying the indication. The operation then goes back to the step ST1.

Thus, when the user performs class changeover on the external device based on the connection-setting change indication display to set its class to the mass storage class and try again to connect the external 1 device to the television receiver 100, the television receiver 100 can recognizes that the connected external device is USB device that can correspond to the television receiver 100. This enables the USB device and the apparatus of displaying the image (the television receiver 100) to be connected to each other in the mass storage class.

The connection in the image class (the connection using a picture transfer protocol (PTP) or the connection in a PictBridge mode) is used in a case where image data stored in the USB device is read for only a printer which prints the image data. The connection in the image class has less function using the image data than that of the connection in the mass storage class that can record and reproduce the image data in the USB device. Therefore, even if the USB device is set to the image class, it is possible to indicate the user according to the processing at the steps ST7, ST8, and ST10, that the connection in the mass storage class has preference to the connection in the image class. This enables the user to change the class of the external device to the mass storage class based on the indication, thereby allowing the external device (USB device) to be usefully utilized.

At the step ST12, the control unit 151 determines whether or not the external device has a vender specific class. If the class checked at the step ST5 is included in the vendor specific class, the operation goes to step ST13. If the class checked at the step ST5 is not included in the vendor specific class, the operation goes to step ST16.

Figure 3E:
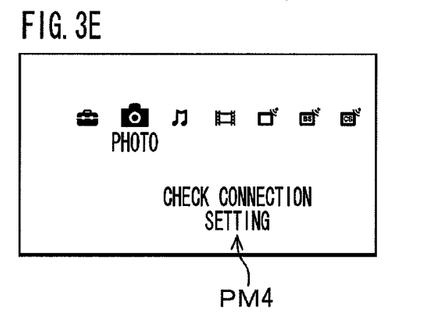

At the step ST13, the television receiver 100 displays any connection-setting check indication and displays a message to advise the user to check the connection setting of the connected external device. For example, the control unit 151 controls the signal-generating unit 133 to display a message PM4 as shown in FIG. 3E. The operation then goes to step ST14.

At the step ST14, the control unit 151 determines whether or not the connection of the external device has been released. If the external device keeps on connecting the television receiver 100, the operation goes back to the step ST14. If the connection of the external device has been released, the operation goes to step ST15. At the step ST15, the control unit 151 finishes displaying the indication. The operation then goes back to the step ST1.

Thus, when the user performs class changeover on the external device based on the connection-setting check indication display to try again to connect the external device to the television receiver 100, it is possible to connect to the television receiver 100 the USB device that can correspond to the television receiver 100 in, for example, the mass storage class or the image class.

For the vendor specific class, any software such as a class driver and an application which the vendor specifically creates is used. If the apparatus of displaying the image (the television receiver 100) does not previously install such the software, it is difficult for the television receiver 100 to recognize the external device that has been set to the vender specific class as the USB device that can correspond to the television receiver 100. Even if, however, the external device has been set to the vender specific class, it is possible to indicate the user that he or she check the connection setting according to the operations at the steps ST12 and ST13, thereby enabling the user to check the connection based on the indication to change the class of the external device to the mass storage class or the image class and read out the image data stored in the external device.

Figure 3F:
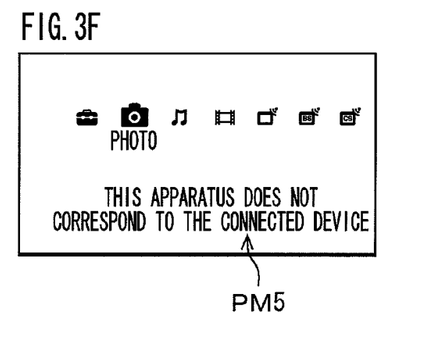

At the step ST16, the television receiver 100 displays any noncorresponding notice and displays, for example, a message PM5 as shown in FIG. 3F to notice the user that the connected external device is not USB device that can correspond to the apparatus of displaying the image (the television receiver 100).

At the step ST17, the control unit 151 determines whether or not the connection of the external device has been released. If the external device keeps on connecting the television receiver 100, the operation goes back to the step ST17. If the connection of the external device has been released, the operation goes to step ST18. At the step ST18, the control unit 151 finishes displaying the notice. The operation then goes back to the step ST1.

Thus, when the class of the external device is changeable and a set class of the external device is different from the previously specified class of the apparatus of displaying the image (the television receiver 100), the television receiver 100 displays a message that advises the user to change the class of the external device to the previously specified class of the television receiver 100. By such the class changeover, it is possible to prevent the connected external device from being erroneously determined so that although the connected external device is USB device that can correspond to the apparatus of displaying the image (the television receiver 100), the connected external device is not the USB device that can correspond to the apparatus of displaying the image (the television receiver 100). This enables the user to connect the external device to the apparatus of displaying the image surely with ease.

Although the messages using letters have been displayed in FIGS. 3A through 3F, the apparatus of displaying the image can display a message using a symbol.

When the class of the external device is not changeable and a set class of the external device is different from the previously specified class of the apparatus of displaying the image (the television receiver 100), the television receiver 100 displays on its image display unit 136 a message noticing that the television receiver 100 does not correspond to the connected external device.

Thus, the television receiver 100 displays the device connection icon PIusb when the previously specified class of the television receiver 100 includes the class of the external device while the television receiver 100 displays the messages when the previously specified class of the television receiver 100 does not include the class of the external device. This enables the user to determine easily whether or not the connected external device is USB device that can correspond to the television receiver 100.

By executing the operation of the step ST3, it is possible for the user to determine easily that the connection processing of the external device is being executed in the apparatus of displaying the image. If not executing the operation of the step ST3, by displaying any of these messages PM2 through PM5, it is possible for the user to determine easily that the connection processing of the external device is being executed in the television receiver 100. Thus, according to the embodiments of the invention, it is possible for the user to determine that the connection processing of the external device is being executed in the apparatus of displaying the image and that the apparatus of displaying the image does not correspond to the connected external device, which is different from the related apparatus of displaying the image that only displays the device connection icon PIusb when it is determined that the connected external device is USB device that can correspond to the apparatus of displaying the image. Further, since the user can determine that the connection processing of the external device is being executed in the apparatus of displaying the image, it is possible to prevent the user from detaching the external device in error from the apparatus of displaying the image during the connection processing.

It should be understood by those skilled in the art that various modifications, combinations, sub-combinations and alternations may occur depending on design requirements and other coefficients insofar as they are within the scope of the appended claims or the equivalents thereof.

What is claimed is:

1. An image displaying apparatus, which connects to an external device using universal serial bus (USB) connection, the image displaying apparatus comprising:
   a display unit; and
   a control unit that reads device information out of the connected external device and performs display control on the display unit based on the read device information,
   wherein under control of the control unit, the display unit displays a message that is used for changing a set class of the external device to a class previously specified in the image displaying apparatus when the external device is capable of performing external device class changeover and based on the device information the set class of the external device is determined to be different from the class previously specified in the image displaying apparatus,
   wherein the displayed message notifies a user that connection processing of the external device is being executed in the image displaying apparatus, notifies the user to change connection setting of the connected external device, and to check the connection setting of the connected external device, and
   wherein the control unit determines that the external device is capable of performing external device class changeover if vendor identification contained in the device information is identical to vendor identification previously specified in the image displaying apparatus, which is identification of a vendor who presents external devices capable of performing external device class changeover.

2. The image displaying apparatus according to claim 1 wherein the control unit determines that the external device is capable of performing external device class changeover if a set class contained in the device information is set to a vendor specific class of the external device.

3. The image displaying apparatus according to claim 1 wherein the control unit previously specifies a mass storage class as the class previously specified in the image displaying apparatus.

4. The image displaying apparatus according to claim 1 wherein the control unit previously specifies a mass storage class and image class as the classes previously specified in the image displaying apparatus.

5. The image displaying apparatus according to claim 1 wherein when the control unit determines that the external device is not capable of performing external device class changeover and the set class of the external device is different from the class previously specified in the image displaying apparatus, the display unit displays a message notifying that the image displaying apparatus does not correspond to the connected external device.

6. A method of displaying an image in an image displaying apparatus that connects to an external device using USB connection, the method comprising the steps of:
   reading device information out of the external device; and
   displaying a message that is used for changing a set class of the external device to a class previously specified in the image displaying apparatus when the external device is capable of performing external device class changeover and based on the device information the set class of the external device is determined to be different from the class previously specified in the image displaying apparatus,
   wherein the displayed message notifies a user that connection processing of the external device is being executed in the image displaying apparatus, notifies user to change connection setting of the connected external device, and to check the connection setting of the connected external device, and
   wherein the external device is determined to be capable of performing external device class changeover if vendor identification contained in the device information is identical to vendor identification previously specified in the image displaying apparatus, which is identification of a vendor who presents external devices capable of performing external device class changeover.

* * * * *